United States Patent
Huang

(10) Patent No.: US 7,200,000 B1
(45) Date of Patent: Apr. 3, 2007

(54) NOTEBOOK WITH AN AUDIO PLAYER

(75) Inventor: Min-Feng Huang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/371,002

(22) Filed: Mar. 9, 2006

(51) Int. Cl.
*G06F 1/16* (2006.01)

(52) U.S. Cl. ......................... 361/683; 381/87

(58) Field of Classification Search .................. 361/683
See application file for complete search history.

(56) References Cited

U.S. PATENT DOCUMENTS

| | | | | |
|---|---|---|---|---|
| 5,083,290 A | * | 1/1992 | Hosoi | 361/681 |
| 5,784,468 A | * | 7/1998 | Klayman | 381/300 |
| 5,825,614 A | * | 10/1998 | Kim | 361/683 |
| 5,838,537 A | * | 11/1998 | Lundgren et al. | 361/683 |
| 5,917,695 A | * | 6/1999 | Youn | 361/683 |
| 6,067,224 A | * | 5/2000 | Nobuchi | 361/683 |
| 6,078,497 A | * | 6/2000 | Derocher et al. | 361/683 |
| 6,697,495 B1 | * | 2/2004 | Youn | 381/333 |
| 6,794,798 B2 | * | 9/2004 | Watanabe et al. | 310/334 |
| 6,973,360 B1 | * | 12/2005 | Wang et al. | 700/100 |

FOREIGN PATENT DOCUMENTS

TW 575274 2/2004

* cited by examiner

*Primary Examiner*—Anatoly Vortman
*Assistant Examiner*—Anthony Q. Edwards
(74) *Attorney, Agent, or Firm*—Birch, Stewart, Kolasch, and Birch, LLP

(57) ABSTRACT

A notebook with an audio player is provided, wherein one side of the computer mainframe is provided with a receive chamber and is pivotally connected with a display screen. The audio player is connected to one side of the display screen corresponding to the receive chamber, and is capable of sending out upon receiving audio signals sent by the computer mainframe. When the display screen is folded on the computer mainframe, the audio player will be received in the receive chamber along with the movement of the display screen.

4 Claims, 3 Drawing Sheets

NOTEBOOK WITH AN AUDIO PLAYER

BACKGROUND OF THE INVENTION

1. Field of Invention

The present invention relates to a notebook and more particularly to a notebook with an audio player that can be exposed along with a display screen when the display screen is unfolded.

2. Related Art

With the development of the information technology, various kinds of processing devices that are not only multifunctional but also increasingly cheaper become popular among the masses. The volume of conventional data processing devices, from the mainframes of giant servers used in this field and by national defense and academic institutes to the mainframes of personal computers, tend to be gradually reduced. In recent years, particularly with the development of the package technology of related electrical elements, hand-held data processing devices focusing on portability, such as the personal digital assist and the notebook have come out. These kinds of products are characterized in that they are convenient for carrying while the function of data processing is not reduced in the least. Therefore, they are very popular to business people and have currently become mainstream products in this field.

In recent years, the Internet has been developing rather rapidly and everyone can exchange a great variety of information through the Internet, therefore multimedia is applied extremely extensively. Multimedia data can bring people a rich entertainment life by providing lively sound and light effects.

However, as far as the design of the notebook is concerned, the peripherals, especially the sound output devices, have to be somewhat sacrificed in order to meet the requirements of portability. Conventionally, small sized speakers are disposed on the mainframe body of the notebook in order to send out music and various sound effects. However, although the speakers can express the sound reasonably, the sound effects are not good enough. As mentioned above, the reason is that the portable characteristic has to be maintained for the notebook, therefore the space that is available for disposing a speaker is limited, and thus the realizable sound quality, especially the bass sound quality, is not always satisfactory for the users. The problem lies in that the deep and vigorous bass sound effect can only be realized through reasonance; however the space of a notebook that is available for disposing a speaker is too small to provide a larger space for improving the bass sound effect.

A notebook with a speaker is disclosed in ROC patent publication No.575274, wherein, the mainframe body is provided with a receive slot, and an audio output model that can be movably embedded into and can movably protrude from the receive slot is assembled therein. When the display screen of the notebook is unfolded, the audio output model will protrude from the receive slot under the push of the reposition element. When the display screen is folded on the mainframe body, the audio output model will be pushed to be embedded in the receive slot once again.

SUMMARY OF THE INVENTION

With the illumination of the patent publication No. 575274, the inventor provides a notebook with an audio player which can be exposed along with a display screen when the display screen is unfolded.

The preferred embodiment provided by the present invention mainly comprises a computer mainframe, a display screen, and an audio player. One side of the computer mainframe is provided with a receive chamber, and the display screen is pivotally connected to the computer mainframe in such a way that the display screen can be movably unfolded and folded relative to the computer mainframe. The audio player can send out sound upon receiving an audio signal sent out by the computer mainframe. The audio player is connected to one side of the display screen corresponding to the receive chamber. When the display screen is folded on the computer mainframe, the audio player will be received in the receive chamber along the movement of the display screen. In contrast, if the display screen is unfolded, the audio player will protrude from the receive chamber and be exposed along with the movement of the display screen.

While implementing the present invention, unfolding the display screen will change the relative position of the audio player, and the receive chamber available as the audio player is protruded can be used as a resonance space, thus mediant and bass sound effects can be improved.

In order to the make the aforementioned and other objects, features, and advantages of the present invention comprehensible, a preferred embodiment accompanied with figures is described in detail as below.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
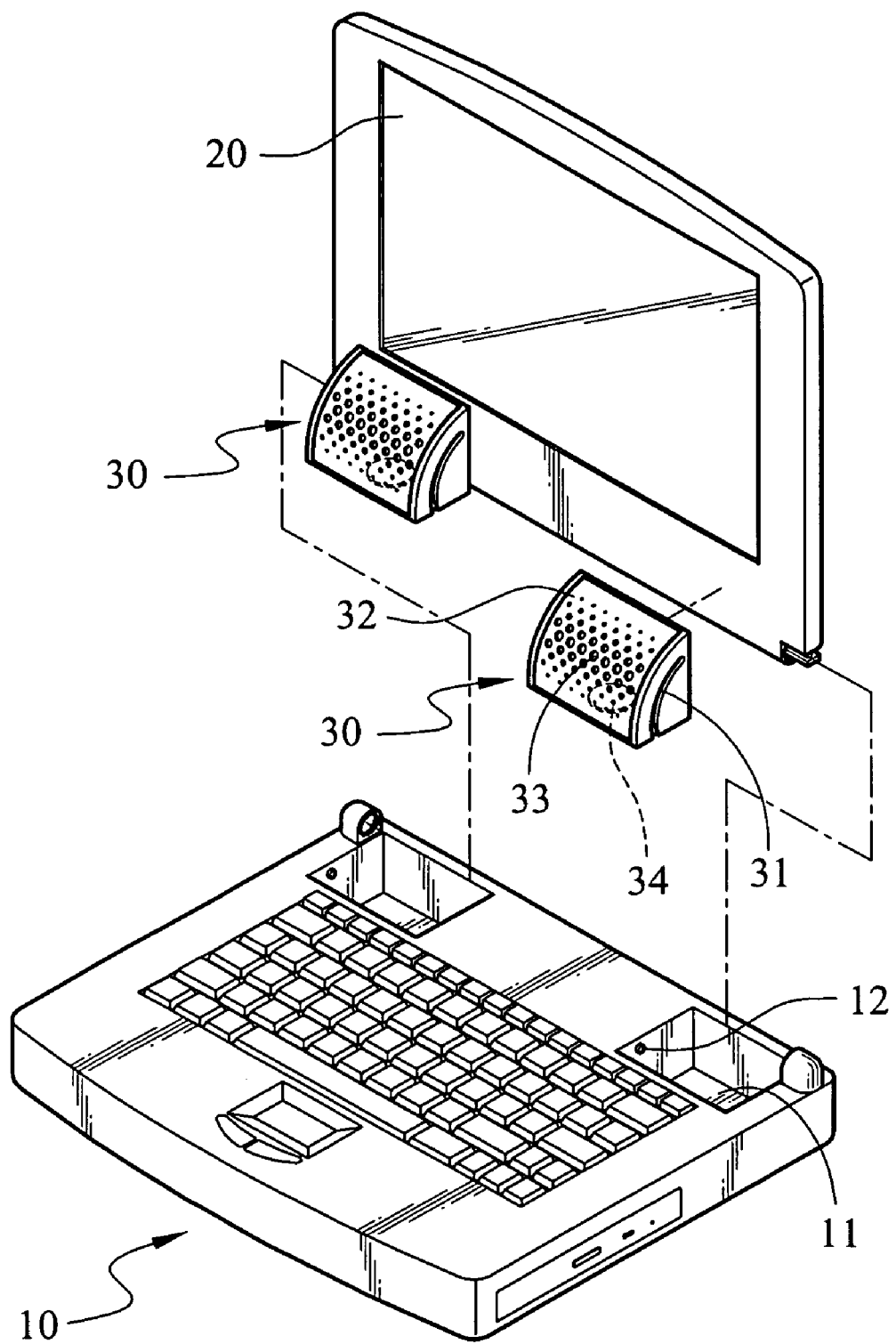
FIG. 1 is a stereogram of the present invention.
Figure 2:
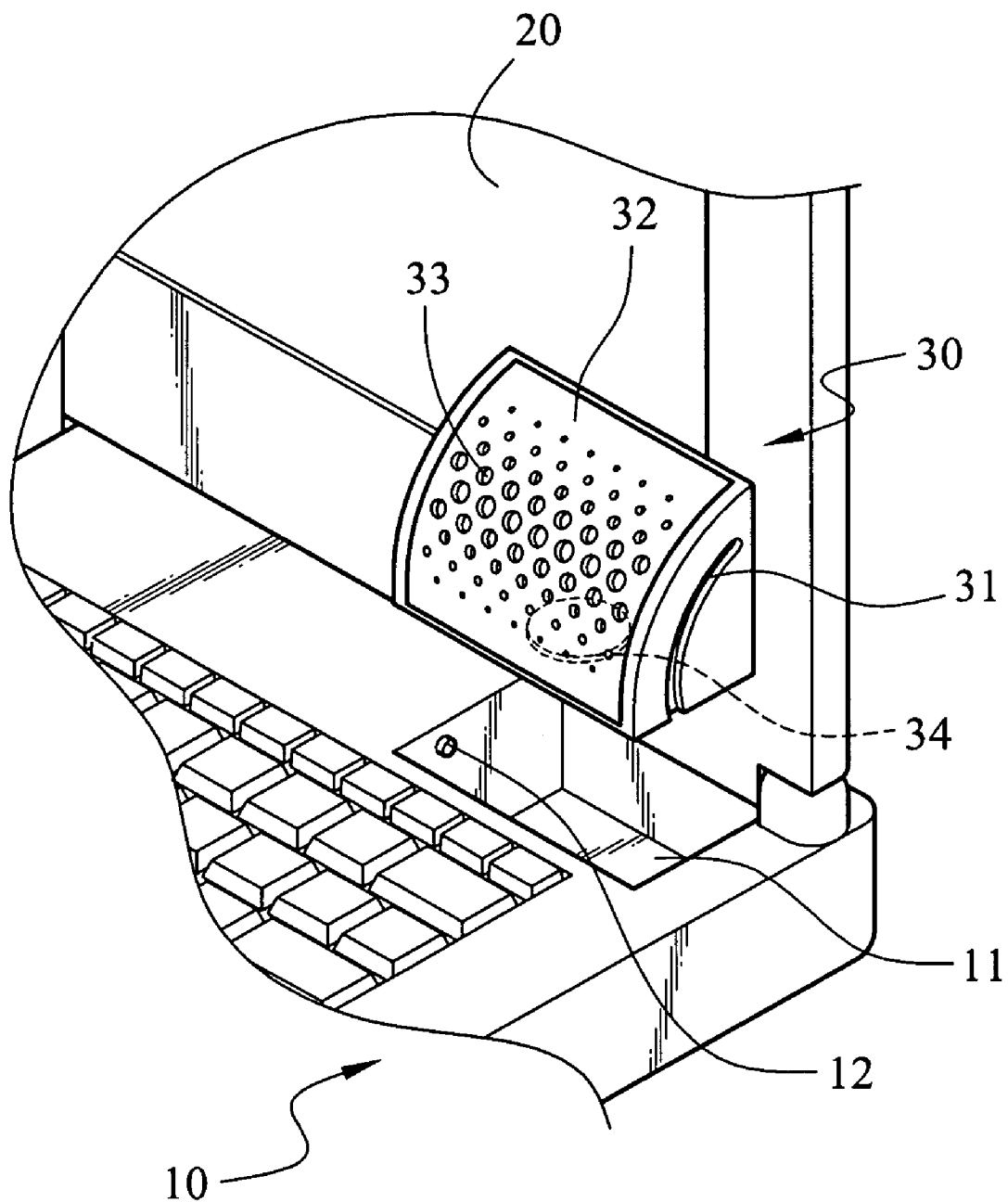
FIG. 2 is partly amplified schematic view of the present invention.

The notebook with an audio player of the present invention is illustrated with reference to FIG. 1 to FIG. 4. A preferred embodiment of the present invention mainly comprises a computer mainframe 10, a display screen 20, and an audio player 30. Practically, the notebook can be divided into two parts, the computer mainframe 10 and the display screen 20. The display screen 20 is pivotally connected to the computer mainframe 10 and can be movably unfolded and folded relative to the computer mainframe.

A receive chamber 11 is provided at the position where the computer mainframe 10 is pivotally connected with the display screen 20. The two opposite sides of the receive chamber 11 are respectively provided with a guide pin 12.

The audio player 30 is connected to one side of the display screen 20, adjacent to the position where the display screen 20 is pivotally connected to the computer mainframe 10, and corresponding to the receive chamber 11. The audio player 30 can send out sound via receiving an audio signal transmitted by the computer mainframe 10. The audio player 30 is covered with a protection cover 32, wherein the protection that is sent out by the audio player 30 to be transmitted outside. Moreover, the two opposite sides of the audio player 30 are provided with an arc slot 31.

Figure 3:
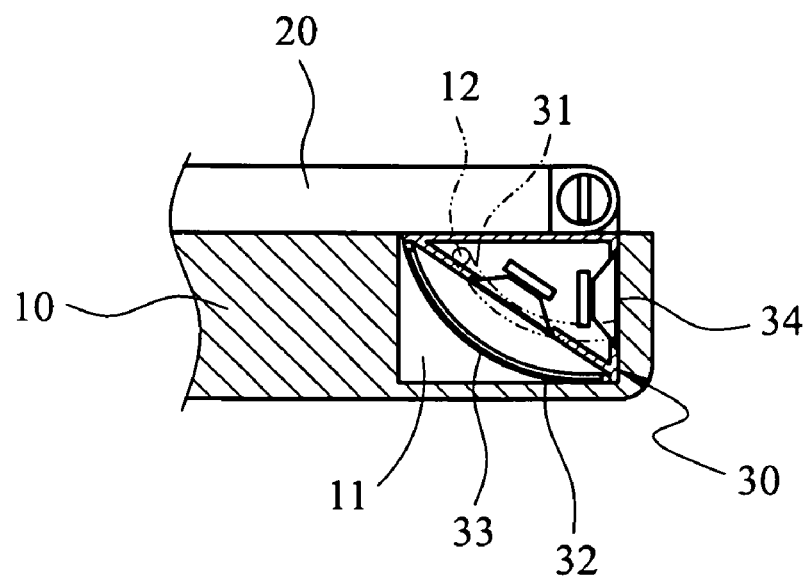
FIG. 3 is a schematic view of the first action according to the present invention.
Figure 4:
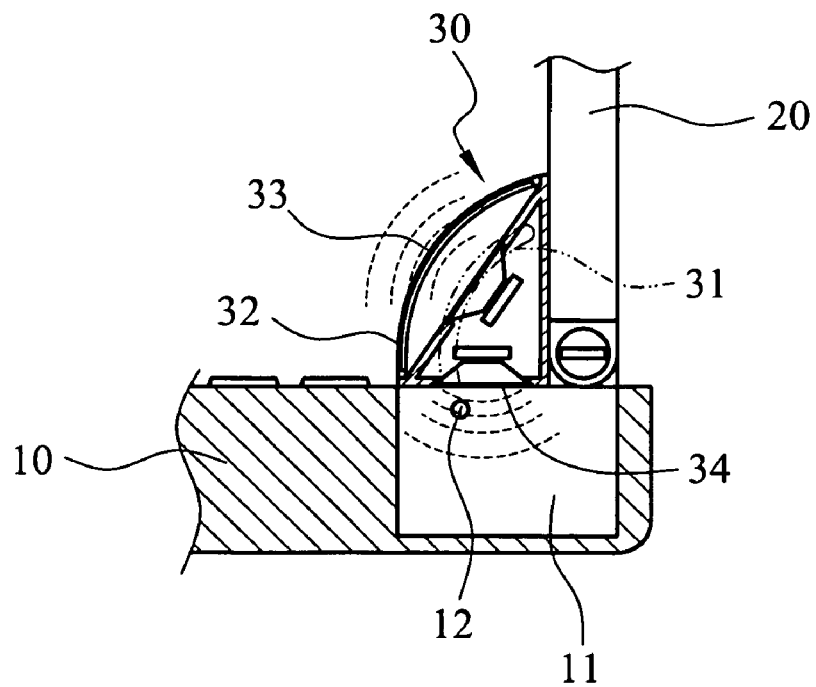
FIG. 4 is a schematic view of the second action according to the present invention.

Still referring to FIG. 3 and FIG. 4, when the display screen 20 is folded on the computer mainframe 10, the audio player 30 is received in the receive chamber 11. When the display screen 20 is unfolded, the audio player 30 will protrude from the receive chamber 11 and be exposed along with the movement of the display screen 20. At the same time, the guide pins 12 located at the two sides of the receive chamber 11 reach into the arc slots 31, thus leading the shift direction of the audio player 30. Sound produced after the exposure of the audio player 30 is transmitted outside from the front-side sound transmissible hole 33, and simultaneously, the sound enters the receive chamber 11 from the downside sound output hole 34, thereby the resonance phenomenon is generated. That means that the audio player sends out sounds via the sound transmissible holes and the downside sound output hole upon receiving the audio signals. Since the downside sound output hole faces the receive chamber when the display screen is unfolded on the computer mainframe, the sounds sent out by the audio player enter the receive chamber to generate resonance phenomenon. Therefore, median and bass sound effects are improved by this resonance phenomenon.

The technical content of the present invention is much similar to ROC patent publication No. 575274 at first glance, but in fact there are many differences. As for the publication No. 575274, the loudspeaker is disposed inside the mainframe body and is connected to a reposition element. When the display screen is folded, the loudspeaker will be pushed into the mainframe body. When the display screen is unfolded, the loudspeaker will protrude from the mainframe body by the elastic force provided by the reposition element.

Referring back to the present invention, the audio player 30 thereof is connected to the display screen 20 rather than being disposed inside the computer mainframe 10. Moreover, the present invention does not have a reposition element disposed. According to the present invention, when the display screen 20 is unfolded, the audio player 30 will move away from the receive chamber 11 along with the movement of the display screen 20 without the push of a reposition element. As far as the objects and the effects are concerned, the two publications are perhaps alike. However, the two of them can be totally different when it comes to the technical level. The present invention has sufficiently met the progressive requirement of a patent application.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A notebook with an audio player, comprising:
   a computer mainframe, provided with a receive chamber at one side thereof and sending out audio signals;
   a display screen, pivotally connected to the side of the computer mainframe to be movably unfolded and folded; and
   an audio player, disposed at one side of the display screen corresponding to the receive chamber and having sound transmissible holes and a downside sound output hole, wherein when the display screen is folded on the computer mainframe, the audio player is received in the receive chamber along with the movement of the display screen, and when the display screen is unfolded on the computer mainframe, the audio player is protruded from the receive chamber along with the movement of the display screen, the sound transmissible holes faces outside and the downside sound output hole faces the receive chamber, the audio player sending out sounds via the sound transmissible holes and the downside output hole upon receiving the audio signals to generate resonance phenomenon.

2. The notebook with an audio player of claim 1, wherein the audio player is located at the position where the display screen is pivotally connected to the computer mainframe.

3. The notebook with an audio player of claim 1, wherein the two opposite sides of the receive chamber are respectively provided with a guide pin.

4. The notebook with an audio player of claim 1, wherein the two sides of the audio player are respectively provided with an arc slot just for the guide pin to reach into.

* * * * *